(12) United States Patent
Gilmore

(10) Patent No.: US 6,299,105 B1
(45) Date of Patent: Oct. 9, 2001

(54) SPACECRAFT WITH AN ENVIRONMENTALLY RELEASED DEPLOYABLE STRUCTURE

(75) Inventor: William D. Gilmore, Lakewood, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/252,408

(22) Filed: Feb. 18, 1999

(51) Int. Cl.$^7$ .................................................. B64G 1/10
(52) U.S. Cl. ............................... 244/158 R; 244/173
(58) Field of Search ............................. 244/158 R, 173

(56) References Cited

U.S. PATENT DOCUMENTS

| | | | |
|---|---|---|---|
| 3,268,184 | * | 8/1966 | Biggar et al. .................... 244/158 |
| 5,027,892 | * | 7/1991 | Bannon et al. ................. 244/158 R |
| 5,060,888 | * | 10/1991 | Vezain et al. .................... 244/158 R |

* cited by examiner

Primary Examiner—Robert P. Swiatek
(74) Attorney, Agent, or Firm—Robert W. Kaller

(57) ABSTRACT

A spacecraft comprising a spacecraft body and a deployable structure coupled to the spacecraft body. The deployable structure is operable between a stowed state and a deployed state. The deployable structure is held in the stowed state during a first operative phase by a holding device. The holding device is responsive to a preselected environmental circumstance and is operative to release the deployable structure after exposure to the preselected circumstance for a preselected criterion occurring in a second operative phase. A deployment mechanism is operative to deploy the deployable structure after the holding device releases the deployable structure. The preselected environmental criterion can be atomic oxygen, radiation, thermal cycling or any other environmental circumstance known to exist in space, and, the preselected criterion can be total dosage, number of thermal cycles or the like.

18 Claims, 9 Drawing Sheets

10

SPACECRAFT WITH AN ENVIRONMENTALLY RELEASED DEPLOYABLE STRUCTURE

BACKGROUND OF THE INVENTION

The present invention relates generally to deployable structures and more particularly to a spacecraft body having a deployable structure held in a stowed state by a holding device which is responsive to an environmental circumstance and is operative to release the deployable structure after the holding device is exposed to the environmental circumstance for a preselected criterion.

Deployable structures such as solar arrays and antennas are frequently used in spacecraft applications where a compact structure is required during a first stage and is deployed to a larger size in a second stage. Typically the first stage occurs when the spacecraft is coupled to a launch vehicle during the launch stage where the spacecraft is confined to a compact space. The second stage occurs when the spacecraft decouples with the launch vehicle in the deployment stage and subsequently expands in size by deploying the spacecraft' deployable structures such as antennas, booms, sensors, solar panels, and the like.

During the launch stage, deployable structures are positioned in a stowed state and secured in that stowed state with a holding device which has sufficient holding force to prevent the deployable structure from deploying until the desired time. At the desired time, an electrical signal is typically sent to the holding device instructing the holding device to release the deployable structure.

Clamps, bolts and gimbals are typically used as the holding device where the clamp opens, the bolt explodes or the gimbal moves in response to the electrical signal. Typically, the electrical signal used to release the holding device is generated by a human located in a ground control unit and is sent to the spacecraft. The drawback in this type of a system is that it is dependent on the spacecraft having the ability to receive and correctly process the electrical signal. If the spacecraft is oriented such that the electrical signal cannot be received, or, if the receive system is not functioning properly, the spacecraft will not receive the electrical signal and will subsequently not release the deployable structure which can be fatal to the spacecraft mission. In the case of deployable solar array, the solar arrays cannot deploy and the spacecraft will not be able to recharge the batteries resulting in a dead spacecraft. In the case of an antenna, the antenna cannot deploy limiting the communications capability of the spacecraft.

One method known to address this drawback is to provide an on-board spacecraft processor which is programmed to generate the electronic signal at a preselected time and send that signal to the holding device. The holding device releases the deployable structure in response to the signal thereby negating the need for ground control. However, this type of system is dependent on the processor to generate the electronic signal at the appropriate time which is in turn dependent on the reliability of the components within the processor. The components or processor can become damaged or fail such that the electronic signal is not generated.

What is needed therefore is a holding device which would release at a preselected time free of dependence on a human generated or electronically generated signal.

SUMMARY OF THE INVENTION

The preceding and other shortcomings of the prior art are addressed and overcome by the present invention which provides, in a first aspect, a spacecraft comprising a deployable structure having a stowed state and a deployed state. A holding device is coupled to the deployable structure and holds the deployable structure in a stowed state during a first operative stage. The holding device is responsive to a preselected environmental circumstance present during a second operative phase. The holding device is operative to release the deployable structure after being exposed to the preselected circumstance for a preselected criterion. A deployment mechanism is operative to deploy the deployable structure after the holding device releases the deployable structure.

For a first aspect of the invention, the holding device is fabricated of a material or a plurality of materials which are responsive to a preselected environmental circumstance, such as a presence of atomic oxygen, radiation, temperature or thermal cycles which occurs in the second operative phase. Prior to exposure to the environmental circumstance, the holding device has sufficient holding strength to hold the deployable structure in the stowed state. Upon exposure to the preselected environmental circumstance for a preselected criterion, such as time, total dosage or a number of thermal cycles, the holding device loses said sufficient holding strength to hold the deployable structure in a non-deployed state thereby releasing the deployable structure.

For a second aspect of the invention, the holding device is comprised of an energy generating device and a releasable clamping mechanism. The energy generating device is responsive to a preselected environmental circumstance such that upon exposure to the preselected environmental circumstance for a preselected criterion, the energy generating device generates a preselected amount or level of energy. The releasable clamping mechanism is responsive to the energy generated by the energy generating device and is operative to release the deployable structure from the stowed state upon exposure to the energy.

BRIEF DESCRIPTION OF THE DRAWINGS

Reference is now made to the detailed description of the preferred embodiments illustrated in the accompanying drawings, in which.

DETAILED DESCRIPTION OF THE PREFERRED EMBODIMENTS

Figure 1:
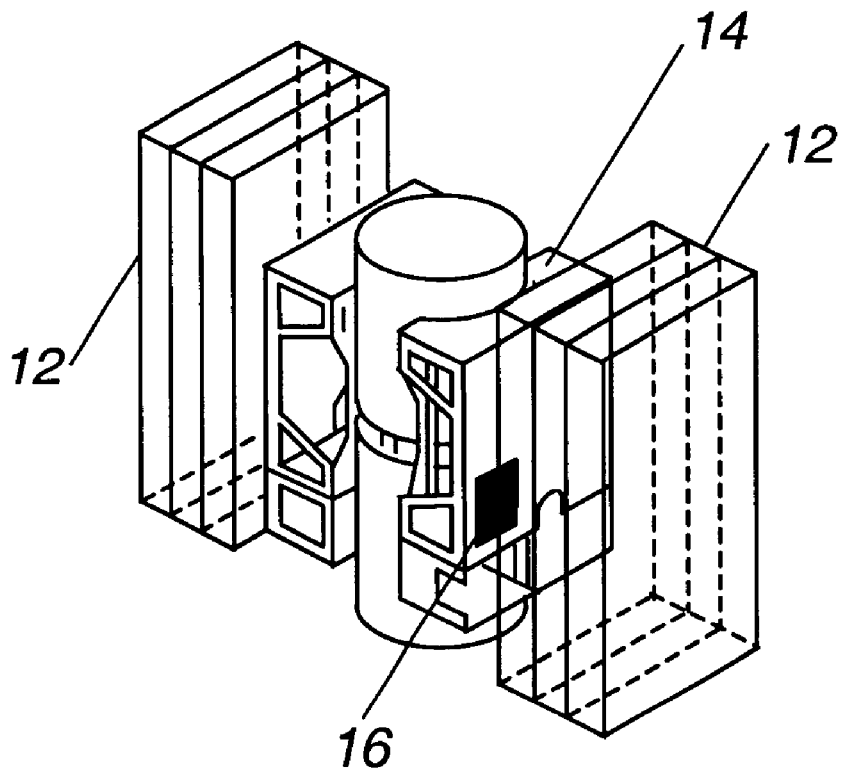
FIG. 1 is an isometric view of a spacecraft having deployable structures in a stowed state.
Figure 2:
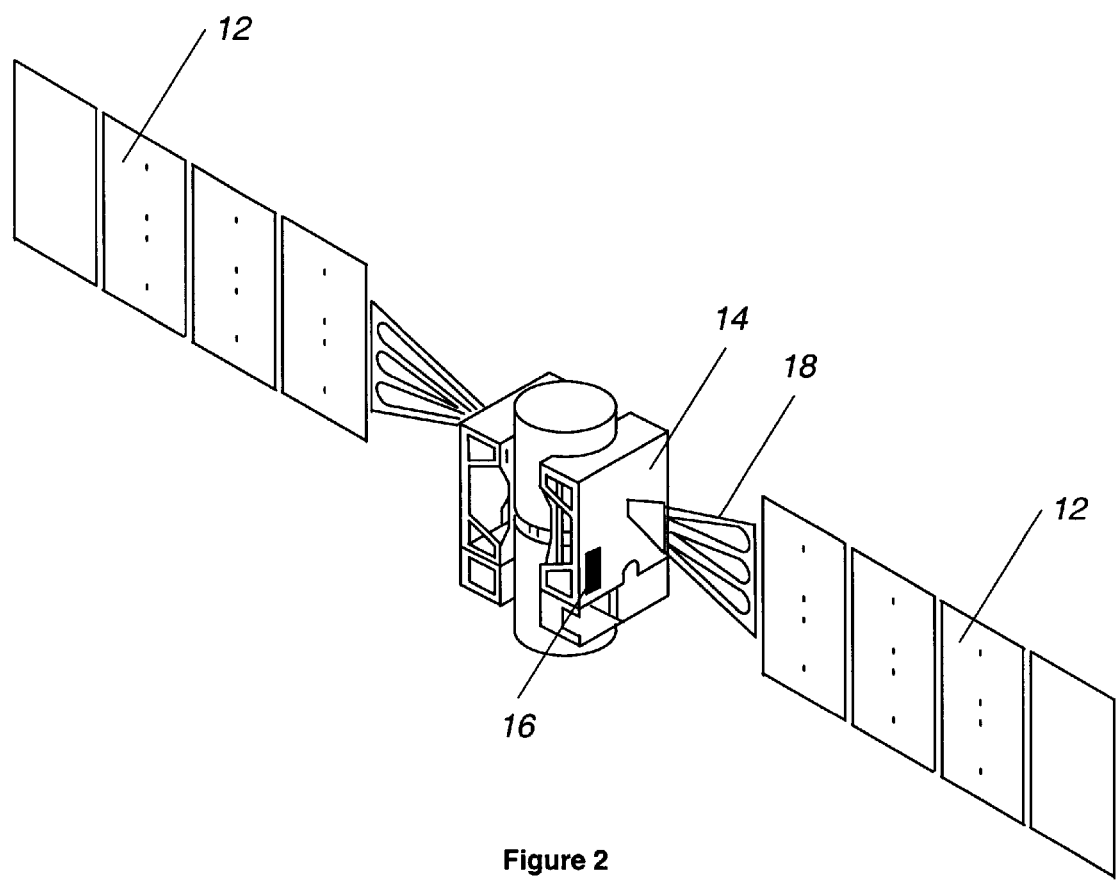
FIG. 2 is an isometric view of a spacecraft having deployable structures in a deployed state.

FIGS. 1 & 2 shows a spacecraft 10 in accordance with the present invention. The spacecraft 10 includes at least one deployable structure 12 coupled to the spacecraft body 14. The deployable structure 12 can be a deployable solar array, deployable boom assembly, deployable antenna, or the like which is operable between a stowed state (FIG. 1) and a deployed state (FIG. 2). A holding device 16 is coupled to the spacecraft body 14 and holds the deployable structure 12 in a stowed state during a first operative phase, such as during a spacecraft lift-off phase. The holding device 16 is responsive to a preselected environmental circumstance such as a preselected temperature, a preselected dosage of radiation, a preselected number of thermal cycles, a preselected amount of atomic oxygen or the like which occurs in a second operative phase, preferably the spacecraft deployment phase. The holding device 16 is operative to release the deployable structure 12 after being exposed to the preselected environmental circumstance for a preselected criterion such as a preselected amount of time, a preselected number of thermal cycles, a preselected level of radiation, temperature or the like which occurs during the deployment phase. After the holding device 16 releases the deployable structure 12, the deployment mechanism 18 is operative to deploy the deployable structure 12. In this manner, the spacecraft 10 can release the deployable structure 12 free of man-made or electronically generated control signals.

Figure 3:
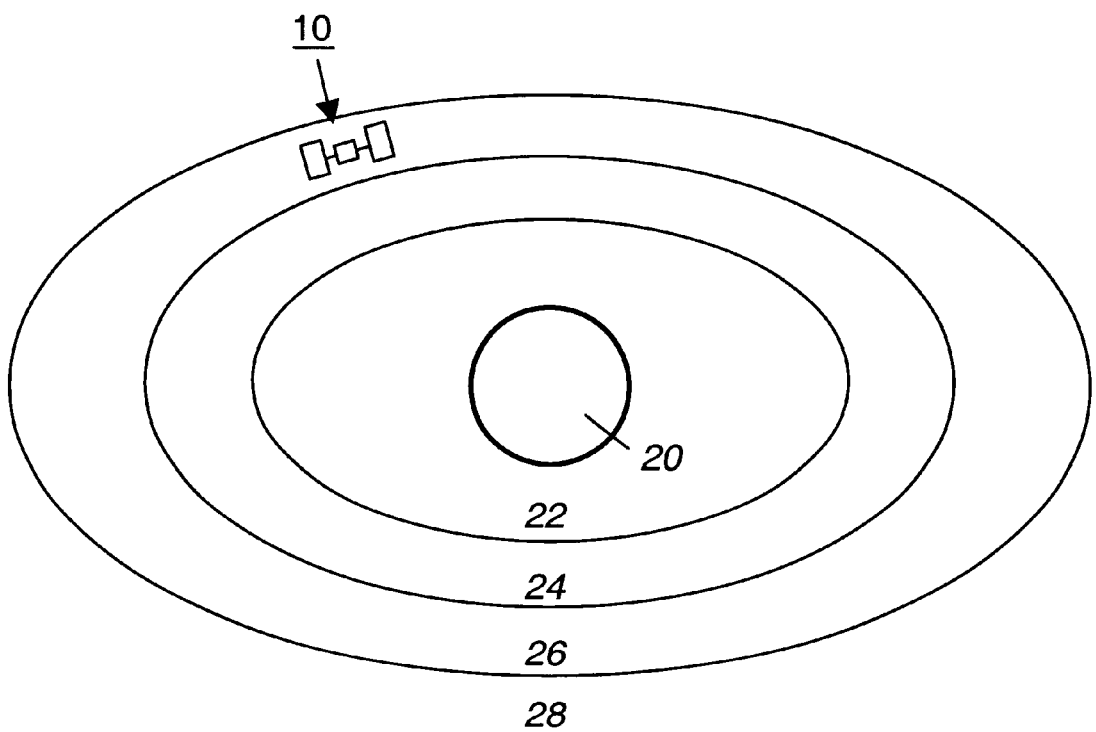
FIG. 3 is an isometric view of the earth and various space orbits.

The exact configuration of the holding device 16 is determined by such factors as the altitude at which the deployment phase occurs, the flight profile of the spacecraft, the desired time of deployment, or the like. For example, referring to FIG. 3, the space environment 19 has different characteristics at different altitudes above the earth 20. One characteristic of a very low earth orbit altitude 22, which is approximately between 100 and 250 km above the earth 20, is high levels of atomic oxygen. A characteristic of a low earth orbit (LEO) altitude 24, which is approximately between 250 and 1000 km, is many eclipses per day and thus many thermal cycles per day. A characteristic of a medium earth orbit (MEO) altitude 26, which is between approximately 1000 and 20,000 km above the earth, is high radiation levels, and, a characteristic of a geosynchronous and high earth orbit (GEO/HEO) altitude 28, which is approximately above 20,000 km above the earth 20, is extreme cold temperatures.

A holding device 16 (FIGS. 1 & 2) which is configured to be operative to release the deployable structure 12 in a particular altitude 22–28 (FIG. 3) could be fabricated of a material or a plurality of materials which is responsive to the particular environmental circumstance present at that particular altitude 22–28 Such a holding device could be fabricated of a material or a plurality of materials having sufficient material strength to hold the deployable structure 12 in a stowed state during the launch phase but weaken with exposure to the preselected environmental circumstance. After being exposed to the preselected environmental circumstance for a preselected criterion, the material strength of the holding device 16 would be weakened and the holding device 16 would no longer have sufficient material strength to hold the deployable structure 12 in a stowed state. Once the holding device 16 can no longer hold the deployable structure 12 in a stowed state, the deployment mechanisms 18 are free to deploy the deployable structure 12. Detailed below are examples of possible configurations for various holding devices 16 which would be operative in the different environments present in various earth orbits 22–28.

One example of a holding device 12 which would be operative in a very low earth orbit altitude 22 is a holding device 16 fabricated from a material, such as kapton or bare carbon. This holding device 16 would be operative in a very low earth orbit altitude 22 (FIG. 3) because the kapton or bare carbon corrodes with exposure to atomic oxygen. A very low earth orbit altitude 22 of between approximately 100 and 250 km above earth 20 has a characteristically high level of atomic oxygen. This atomic oxygen produces an ionized oxygen atmosphere which causes fairly rapid erosion in various materials, such as kapton and bare carbon, with typical erosion rates on the order of mils per day. A holding device 16 manufactured from a material responsive to an ionized oxygen atmosphere would erode at an approximately known rate in an atomic oxygen environment. The holding device 16 would be configured to have sufficient material strength to hold the deployable structure 12 in a stowed state during the lift-off phase. However, upon entering the deployment phase which occurs in a very low earth orbit 22, the holding device 16 is exposed to the atomic oxygen present in that orbit 22. After the holding device 16 is exposed to the atomic oxygen for a preselected amount of time, such as hours, days or weeks, the holding device 16 will have corroded by a sufficient amount so that the holding device 16 lacks the holding strength necessary to continue to hold the deployable structure 12 in a stowed state whereupon the deployment mechanism 18 is free to deploy the deployable structure 12.

One example of a holding device 16 which would be operative in a LEO altitude 24 is a holding device 16 fabricated from a plurality of materials bonded or coupled together with each material having a different coefficient of thermal expansion. This holding device 16 would be operative in a LEO altitude 22 since the environment at in a LEO altitude 24 includes many thermal cycles. A spacecraft 10 flying in a LEO altitude 24 would experiences many thermal cycles per day comprised of a hot circumstance, when the spacecraft 10 is exposed to sunlight, followed by a cold circumstance, when the spacecraft 10 is in a sun shaded or eclipse circumstance. A holding device 16 manufactured from materials which are bonded or coupled together with each material having a different coefficient of thermal expansion would fatigue and crack after an approximately known number of thermal cycles and would lose holding strength after exposure to thermal cycling.

The holding device 16 would be configured such that prior to exposure to the preselected number of thermal cycles, the holding device 16 has sufficient holding strength to hold the deployable structure 12 in a stowed state. But, after exposure to a preselected number of thermal cycles, the holding device 16 has fatigued to a sufficient level that the holding device 16 lacks the holding strength necessary to continue to hold the deployable structure 12 in a stowed state. One example of two such materials having different coefficient of thermal expansion is a composite material and a fiberglass material. A holding device 16 comprised of these two materials bonded together would fatigue and crack after a relatively low number of thermal cycles since the composite material has a low coefficient of thermal expansion whereas the fiberglass material has a high coefficient of thermal expansion.

Figure 4A:
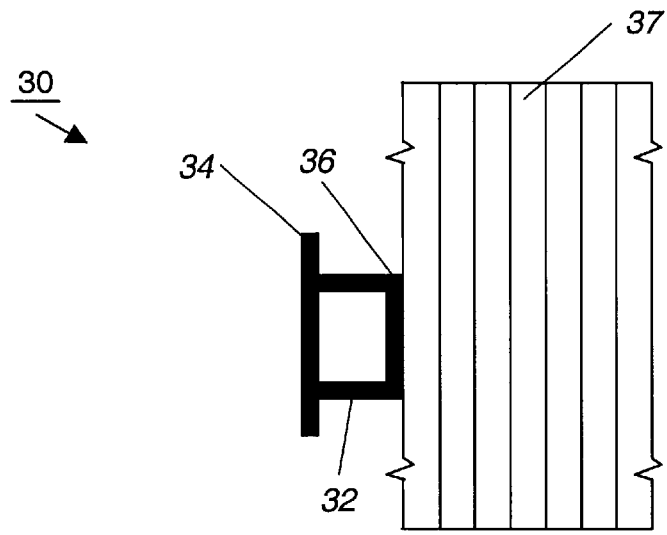
FIGS. 4a–4c, 5–8 and 9a–9b depict side views of example embodiments of the invention.
Figure 4B:
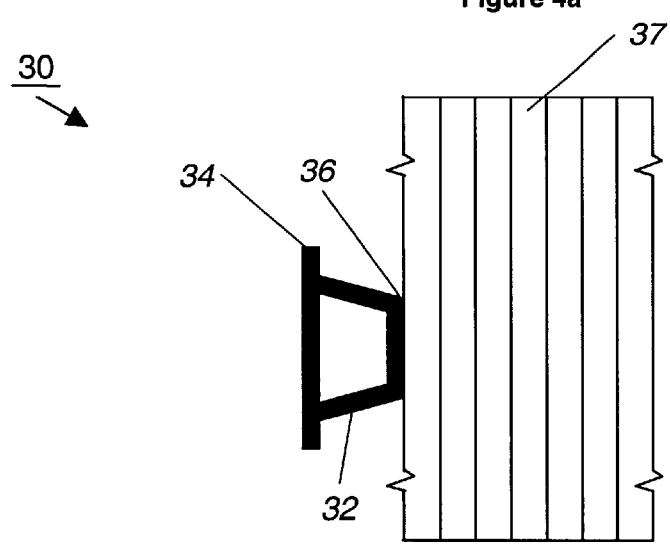
Figure 4C:
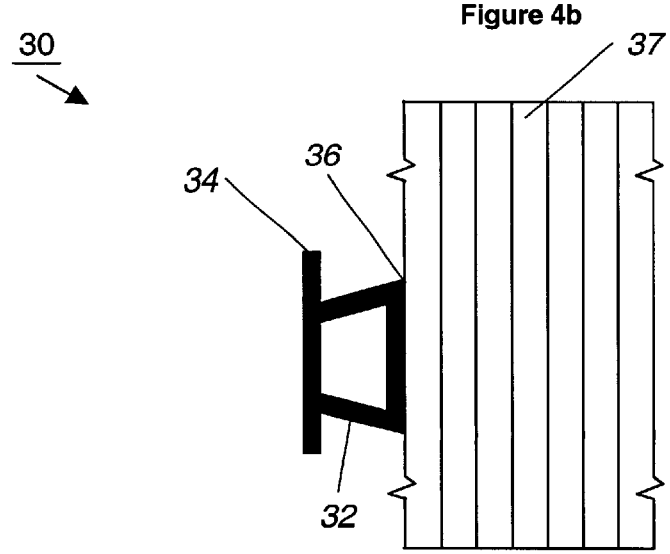

Referring to FIGS. 4a–4c, another example of a holding device operative in a LEO altitude 24 is a holding device 30 comprised of a metal frame 32 coupled to a composite material panel 34. This holding device 30 would be operative in an environment having many thermal cycles due to the large difference in the coefficient of thermal expansion of the metal and composite materials. For this example, the composite material panel 34 is coupled to the deployable structure 37 and the metal frame 32 is configured to have a stress point 36. As shown in FIG. 4b, an eclipse state or cold state causes the metal frame 32 to contract whereas, as shown in FIG. 4c, a sun state or hot state causes the metal frame 32 to expand. The holding device 30 is configured so that the stress point 36 on the metal frame 32 fatigues and cracks after a preselected number of thermal cycles after which the holding strength of the holding device 30 is no longer sufficient to hold the deployable structure 37 in a stowed state.

Referring back to FIG. 3, a holding device operative in a MEO altitude 24 would be configured to be responsive to the particular environment present in a MEO altitude 24. Referring back to FIGS. 1–3, an example of a possible holding device 16 which would be operative to release the deployable structure 12 in a MEO altitude 26 is an holding device 16 fabricated from a material such as a polymer material which is responsive to radiation. A spacecraft 10 orbiting the earth in a MEO orbit 26, which between approximately 1,000 km and 20,000 km above the earth 20, orbits the earth 20 in the middle of the Van Allen radiation belts which subject the spacecraft 10 to a harsh radiation environment. A holding device 16 manufactured from a material such as a polymer material would become brittle in a harsh radiation environment and, as such, would fatigue and crack with increased exposure to the radiation environment. The holding device 16 is configured to have sufficient holding strength to hold the deployable structure 12 in a stowed state during the lift-off stage. Upon entering the deployment phase in a MEO altitude 26, the spacecraft 10 is exposed to radiation. After exposure to the radiation for a preselected criterion such as a preselected period of time or total dosage amount, the holding device 16 fatigues and cracks which weakens the holding strength of the holding device 16. The holding device 16 is configured so that the weakened holding strength of the holding device 16 is insufficient to hold the deployable structure 12 in a stowed state whereupon the deployment mechanism 18 is free to deploy the deployable structure 12.

A holding device 16 which is operative in a HEO/LEO altitude 28 would be configured to be responsive to the particular environment present in a HEO/LEO altitude 28. A possible holding device 16 which would be operative to release the deployable structure in a HEO/LEO altitude 28 is a holding device 16 which is fabricated from a material which is responsive to a preselected temperature extreme, such as a composite material. A spacecraft 10 orbiting the earth 20 in a GEO/HEO altitude 28, which is approximately greater than or equal to about 20,000 km above the earth 20, is subject to an extremely cold temperature of about –181C. A holding device 16 manufactured from a material such as a composite material would become brittle with exposure to an extreme cold temperature and would lose material strength upon exposure to a cold environment. The holding device 16 would be configured so that the material strength of the holding device 16 would be sufficiently weaken after exposure to a preselected cold temperature after which the holding device 16 no longer has sufficient material strength to hold the deployable structure 12 in a stowed state.

Figure 5:
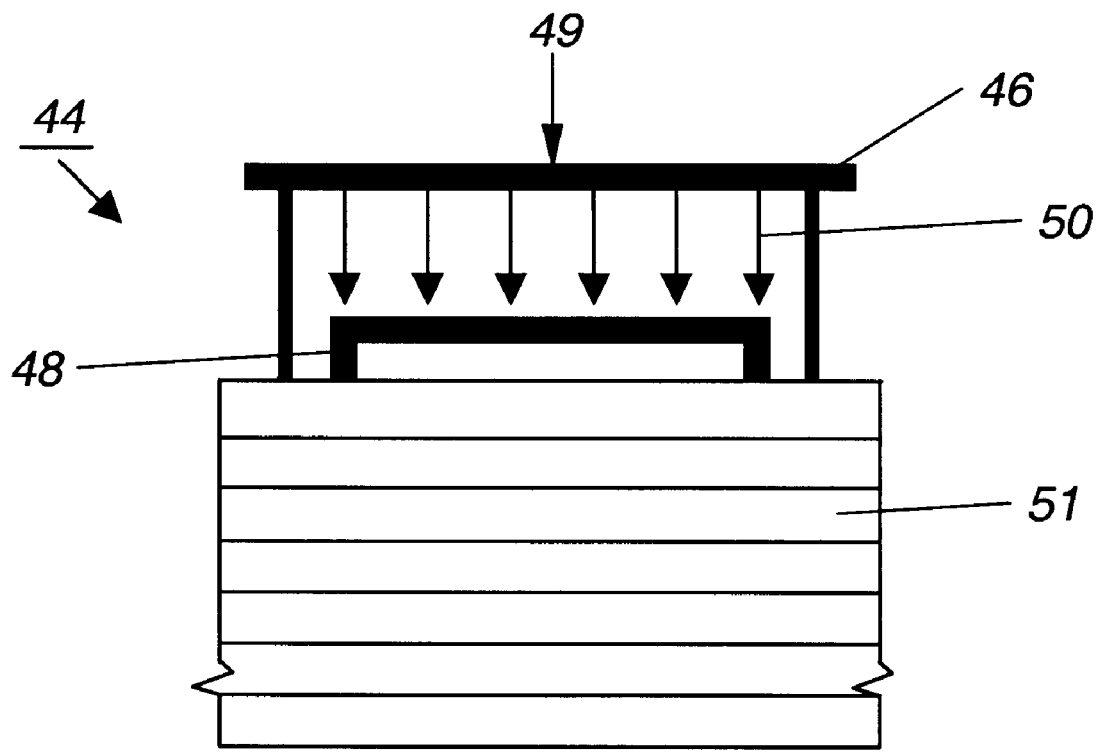
Figure 6:
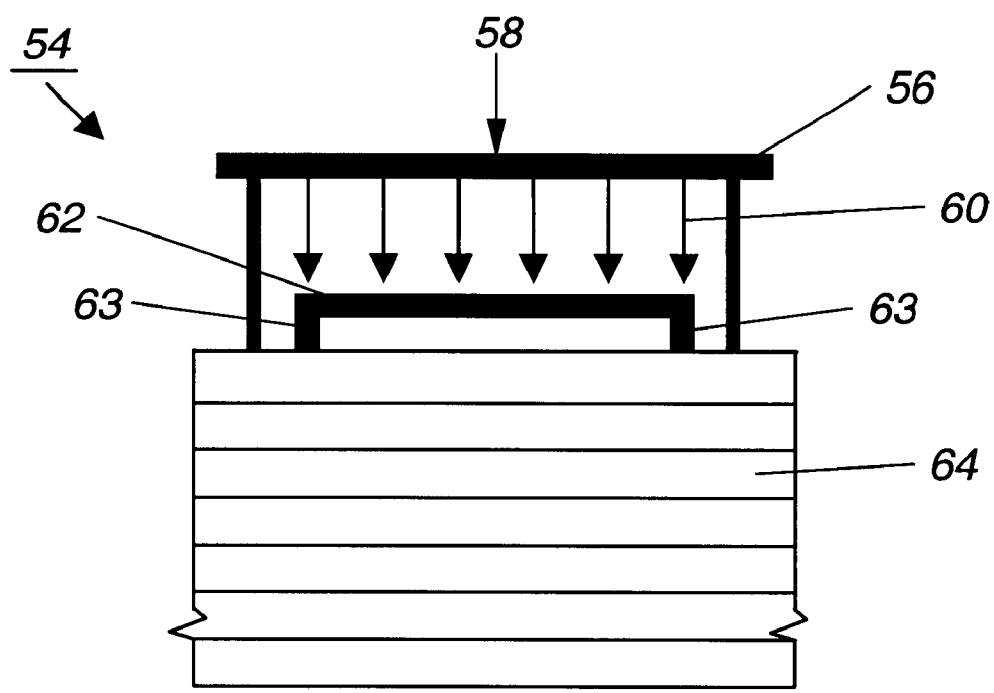
Figure 7:
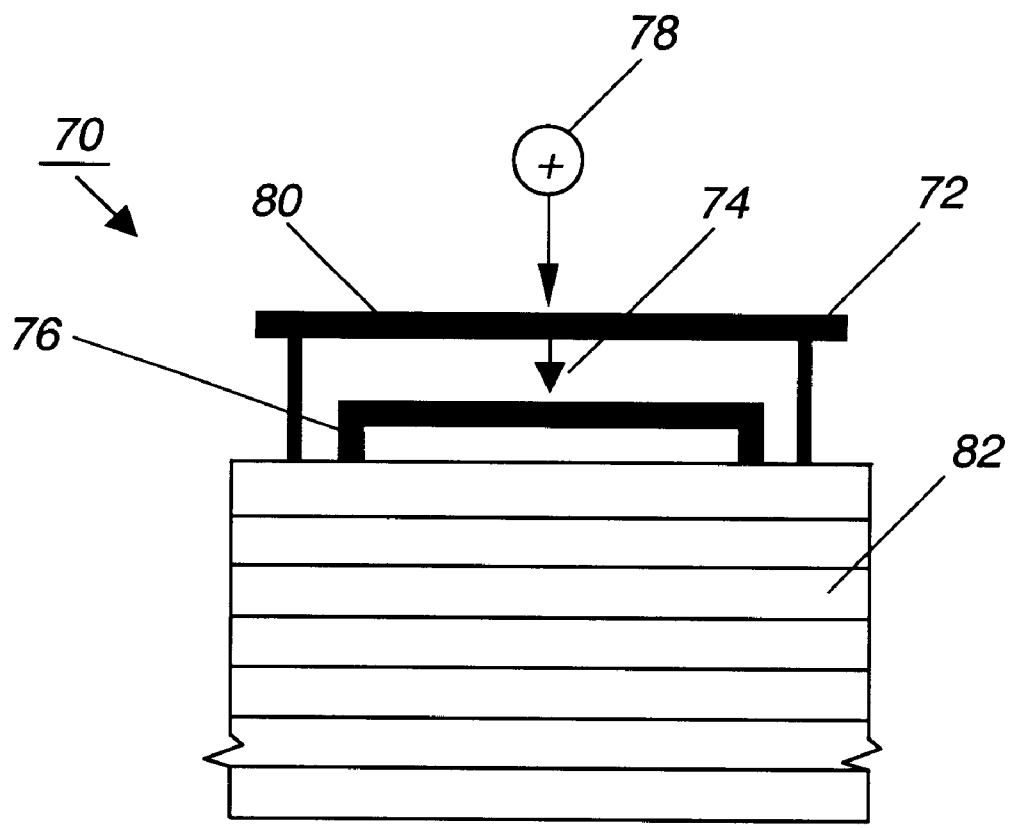
Figure 8:
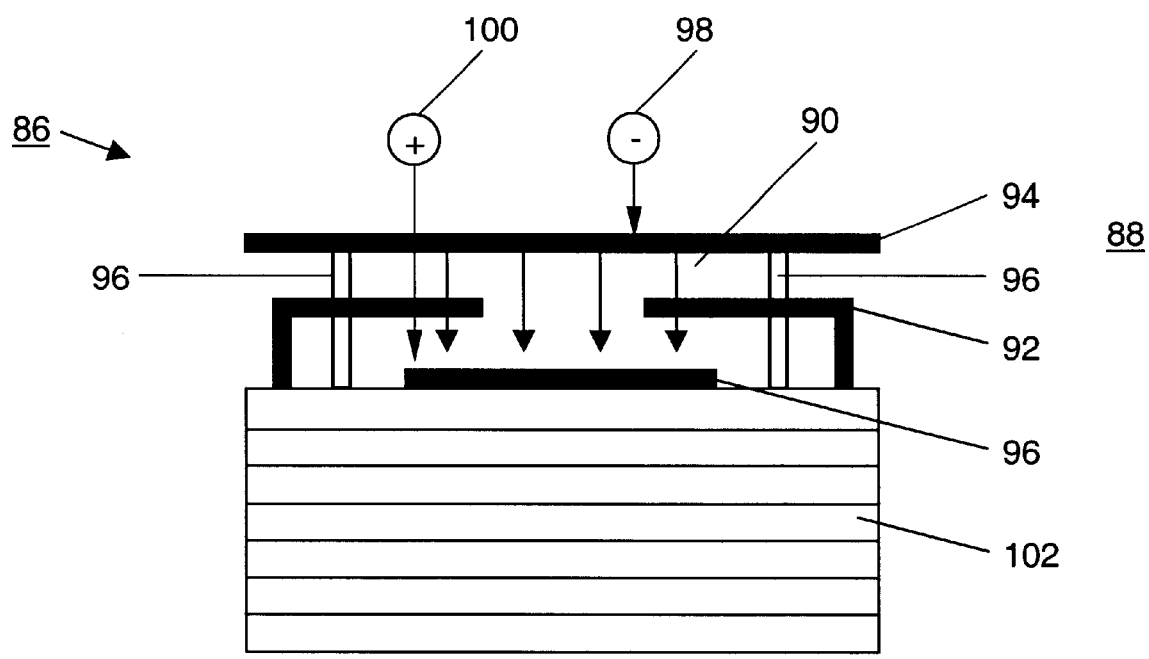

The above examples are directed towards embodiment of the invention in which the holding strength of the holding device weakens with exposure to a particular environmental circumstance. However, the present invention is not limited to such a holding device. Referring to FIG. 5, for an alternative embodiment of the invention, the holding device 44 is comprised of a energy generating device 46 and a releasing clamping mechanism 48. The energy generating device 46 is responsive to a preselected environmental circumstance 49 and generates therefrom energy 50 in the form of heat, electrostatic discharge, electrostatic potential, or the like. The releasable clamping mechanism 48 is responsive to the energy 50 generated from the energy generating device 46 and is operative to release the deployable structure 51 after being exposed to a preselected amount or level of energy generated by the energy generating device 46. FIGS. 6–8 show examples of implementations of this alternative embodiment of the invention.

Referring to FIG. 6, for one alternative embodiment of the invention, the holding device 54 is comprised of an energy generating device 56 which absorbs light 58 and generates heat 60 therefrom. The energy generating device 56 is fabricated of a material which has a high alpha over epsilon property, such as a bare polished metal. Because of the high alpha property of the material, the energy generating device 56 absorbs light 58 extremely well. But, because of the low epsilon property of the material, the activating device 56 has difficulty dispersing the light 58. Therefore, the energy generating device 56 will increase in temperature with increased exposure to light 58. The energy generating device 56 is configured to absorb a preselected amount of light 58 and generate therefrom a preselected amount of heat 60. The releasable clamping mechanism 62 is configured to be responsive to a preselected amount of heat 60 and is operative to release the deployable structure 64 after exposure to the preselected amount of heat 60. For example, portions 63 of the releasable clamping device 60 may be fabricated of a dielectric material which melts with exposure to a preselected amount of heat 60 thereby releasing the deployable structure 64 upon melting the dielectric material.

Referring to FIG. 7, for a second example of an implementation of the alternative embodiment of the invention, the holding device 70 is comprised of an energy generating device 72 which generates an electrostatic discharge 74, and a releasable clamping mechanism 76 which is responsive to the electrostatic discharge 74. A spacecraft is constantly bombarded with positively charged protons 78. The energy generating device 72 is fabricated of a material, such as a metal, which builds up a positive charge 80 in response to being bombarded with protons 78. The energy generating device 72 is configured so that upon a build-up of a preselected amount of positive charge 80, the energy generating device 72 would generate electrostatic discharge 74 of a predetermined level. The releasable clamping mechanism 76 is configured to be responsive to this level of electrostatic discharge 74 and is operative to release the deployable structure 82 after exposure to the electrostatic discharge 74.

Referring to FIG. 8, for a third example of an implementation of the alternative embodiment of the invention, the holding device 86 is comprised of an energy generating device 88, which generates an electrostatic potential 90, and a releasable clamping device 92 which is responsive to the electrostatic potential 90.

The energy generating device 88 is fabricated of two materials 94 and 96 spaced apart from one another, preferably with spacers 97 with one material 94 being configured to absorb electrons 98 and the other material 96 being configured to absorb protons 100.

A spacecraft is constantly bombarded with positively charged protons 100 and negatively charged electrons 98. The first material 94 is preferably selected to be a thin material layer so that positively charged protons 100 having a relatively high mass will penetrate the first material 94 but, negatively charged electrons 98 having a relatively low mass will be absorbed by the first material layer 94. The second material 96 is preferably a substrate which is configured to absorb the protons 100 which pass through the first material 94. In this configuration electrons 98 will be collected by the first material 94 and protons 100 will be collected by the second material 96. The energy generating device 86 is configured so that the build-up of electrons 98 and protons 100 on the first 94 and second 96 materials, respectively, will create a preselected level of electrostatic potential 90 between the first 94 and second 96 materials. The releasable clamping mechanism 92 is configured to be responsive to the preselected level of electrostatic potential 90 and is operative to release the deployable structure 102 after exposure to the preselected level of electrostatic potential 90.

Figure 9A:
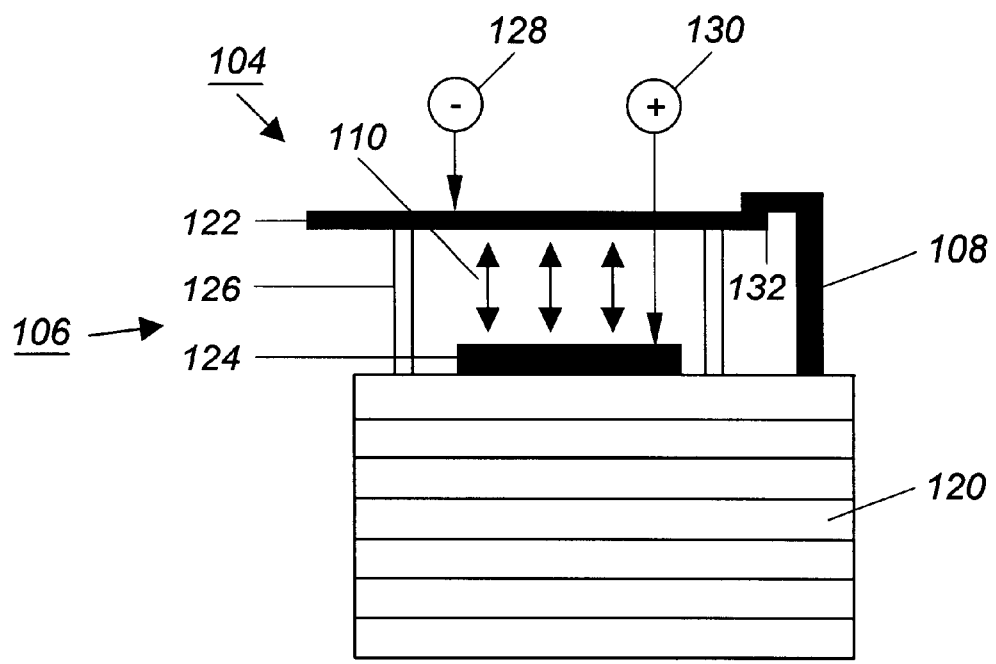
Figure 9B:
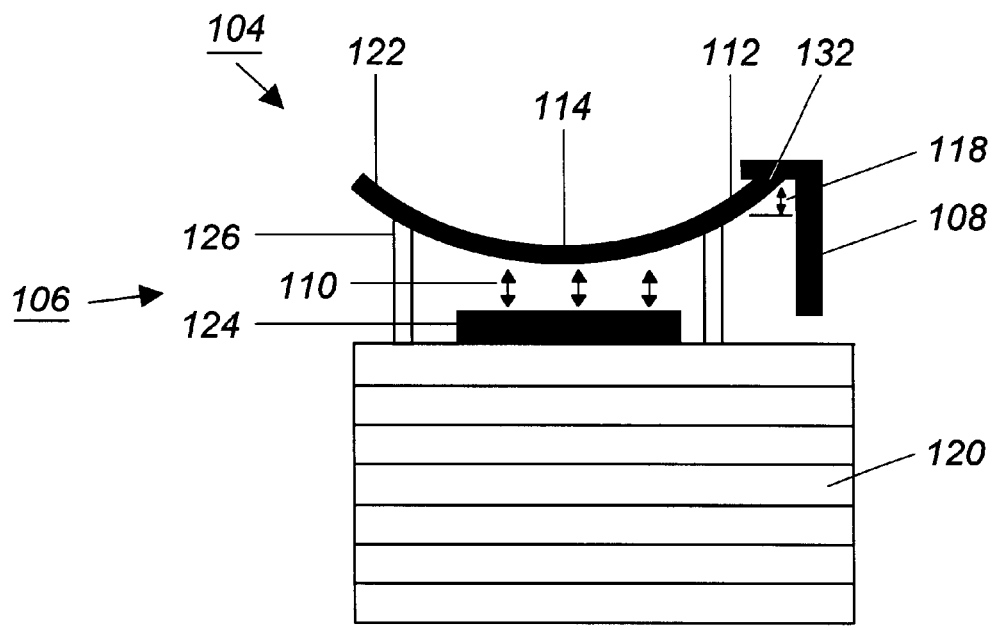

Referring to FIGS. 9a & 9b, for a fourth example of an implementation of the alternative embodiment, the holding device 104 is comprised of an energy generating device 106 and a releasable clamping mechanism 108. The energy generating device 104 generates an electrostatic potential 110 which displaces portions 112, 114 of the energy generating device 106. The releasable clamping mechanism 108 is responsive to the displacement 118 of the energy generating device 106 and is operative to release the deployable structure 120 upon exposure to the displacement 118 of the energy generating device 106.

For this embodiment, the energy generating device 106 is comprised of a thin material layer 122 spaced apart from a substrate 124, preferably by spacers 126. The thin material layer 122 is configured to absorb electrons 128 and the substrate 124 configured to absorb protons 130 generating an electrostatic potential 110 between the thin material layer 122 and the substrate 126. The electrostatic potential 110 will attempt to bring the thin material layer 122 and the substrate 124 into contact with one another. Because the thin material layer 122 is spaced from the substrate 124 by spacers 126, the portion 114 of the thin material layer 122 between the spacers 126 will arch towards the substrate 124 resulting in the edge 132 of the thin material layer 122 being displaced away from the substrate 124 by a preselected distance 118. The releasable clamping mechanism 108 is responsive to the displacement 118 of the energy generating device 106 and is operative to release the deployable structure 120 upon exposure to the displacement 118 of the energy generating device 106.

The embodiments described above were intended for illustrative purposes and were not intended to describe the entire scope of the invention. It will be appreciated by persons skilled in the art that the present invention is not limited to what has been shown and described hereinabove. The scope of the invention is limited solely by the claims which follow.

Referring back to FIGS. 1 & 2, the present invention provides a spacecraft 10 having a deployable structure 12 which is held in a stowed state by a holding device 16 in a first operative state. The holding device 16 is responsive to a preselected environmental circumstance occurring in a second operative state such that upon exposure to the preselected environmental circumstance for a preselected criterion, the holding device 16 becomes operative to release the deployable structure 12 from the stowed state. Thus, the present invention provides a spacecraft 10 in which the deployable structure 12 is released from a stowed state free of a human generated or electronically generated signal.

What is claimed is:

1. A spacecraft comprising:
   a spacecraft body;
   a deployable structure coupled to said spacecraft body and operable between a stowed state and a deployed state with respect to said spacecraft body;
   a holding device coupled to said deployable structure and said spacecraft body, said deployable structure held in said stowed state by said holding device during a first operative phase, said holding device containing a non-adhesive material having a material strength, said non-adhesive material being responsive to a preselected environmental circumstance present during a second operative phase, said material strength weakening upon exposure to said preselected environmental circumstance such that the holding device lacks sufficient material strength to hold said deployable structure in said stowed state after being exposed to the preselected environmental circumstance for a preselected criterion; and,
   a deployment mechanism operative to deploy said deployable structure to said deployed state once said holding device lacks sufficient material strength to hold said deployable structure.

2. The spacecraft of claim 1, wherein said first phase is a launch phase and said second phase is a deployment phase.

3. The spacecraft as in claim 2, wherein said preselected environmental circumstance is a presence of solar radiation and said preselected criterion is a preselected dosage of solar radiation.

4. The spacecraft as in claim 2, wherein said preselected environmental circumstance is an occurrence of preselected temperature and said preselected criterion is a preselected period of time after which said preselected temperature is attained.

5. The spacecraft as in claim 2, wherein said preselected environmental criterion is the occurrence of thermal cycles and said preselected criterion is exposure to a preselected number of said thermal cycles.

6. The spacecraft as in claim 1, wherein said non-adhesive material is a composite material which fatigues and loses material strength upon exposure to said environmental circumstance for said preselected criterion.

7. The spacecraft as in claim 1, wherein said holding device comprises two disparate materials having differing coefficients of thermal expansion being bonded to each other, said holding device having sufficient material strength to hold said deployable structure in said stowed state during said first operative phase, said material strength decreasing after exposure to said preselected circumstance for said preselected criterion occurring in the second operative phase such that the holding device lacks sufficient material strength to hold the deployable structure in a stowed state whereby said holding device becomes operative to release said deployable structure after exposure to said preselected criterion.

8. A spacecraft comprising:
   a spacecraft body;
   a deployable structure coupled to said spacecraft body and operable between a stowed state and a deployed state with respect to said spacecraft body;
   a holding device coupled to said deployable structure and said spacecraft body, said deployable structure held in said stowed sate by said holding device during a launch phase, said holding device being responsive to a presence of atomic oxygen present during a deployment phase, said holding device being operative to release said deployable structure after being exposed to the presence of atomic oxygen for a preselected total dosage of atomic oxygen; and,
   a deployment mechanism operative to deploy said deployable structure to said deployed state after said holding device releases said deployable structure.

9. A spacecraft comprising:
   a spacecraft body;
   a deployable structure coupled to said spacecraft body and operable between a stowed state and a deployed state with respect to said spacecraft body;
   a holding device comprised of a polymer material coupled to said deployable structure and said spacecraft body, said deployable structure held in said stowed state by said holding device during a launch phase, said holding device being responsive to a presence of atomic oxygen present during a deployment phase, said holding device being operable to release said deployable structure after being exposed to the presence of atomic oxygen for a preselected total dosage of atomic oxygen; and,
   a deployment mechanism operative to deploy said deployable structure to said deployed state after said holding device releases said deployable structure.

10. A spacecraft comprising:

a spacecraft body;

a deployable structure coupled to said spacecraft body and operable between a stowed state and a deployed state with respect to said spacecraft body;

a holding device coupled to said deployable structure and said spacecraft body, said deployable structure held in said stowed state by said holding device during a launch phase, said holding device being responsive to a preselected cold temperature present during a deployment phase, said holding device comprised of a composite material which becomes brittle when exposed to said preselected cold temperature and being operative to release said deployable structure after being exposed to the preselected cold temperature; and, a deployment mechanism operative to deploy said deployable structure to said deployed state after said holding device releases said deployable structure.

11. A spacecraft comprising:

a spacecraft body;

a deployable structure coupled to said spacecraft body and operable between a stowed state and a deployed state with respect to said spacecraft body;

a holding device coupled to said deployable structure and said spacecraft body, said deployable structure held in said stowed state by said holding device during a launch phase, said holding device being responsive to an occurrence of thermal cycles present during a deployment phase, said holding device being operative to release said deployable structure after exposure to a preselected number of said thermal cycles, said holding device is comprised of two disparate materials having differing coefficients of thermal expansion being bonded to each other, said holding device having sufficient material strength to hold said deployable structure in said stowed circumstance during said launch phase, said material strength decreasing after exposure to the preselected number of thermal cycles occurring in the deployment phase such that the holding device lacks sufficient material strength to hold the deployable structure in a stowed state whereby said holding device becomes operative to release said deployable structure after exposure to said preselected number of thermal cycles; and, a deployment mechanism operative to deploy said deployable structure to said deployed state after said holding device releases said deployable structure.

12. The spacecraft of claim 11, wherein said two materials are a composite material and a fiberglass material.

13. The spacecraft of claim 11, wherein said two materials are a metal material and a composite material, said metal being material configured in a frame structure coupled to said composite material.

14. A spacecraft comprising:

a spacecraft body;

a deployable structure coupled to said spacecraft body and operable between a stowed state and a deployed state with respect to said spacecraft body;

a holding device coupled to said deployable structure and said spacecraft body, said deployable structure held in said stowed state by said holding device during a launch phase, said holding device being responsive to an occurrence of thermal cycles present during a deployment phase, said holding device being operative to release said deployable structure after exposure to a preselected number of said thermal cycles, said holding device being comprised of a releasable clamping mechanism and an energy generating device, said energy generating device being responsive to said preselected environmental circumstance so that, upon exposure to said preselected environmental circumstance for a preselected criterion, said energy generating device is operative to generate a preselected amount of energy, said releasable clamping mechanism being configured to be responsive to said preselected amount of energy and operative to release said deployable structure from said stowed circumstance after being exposed to said preselected amount of energy.

15. The spacecraft of claim 14, wherein said preselected environmental circumstance is the presence of light, said energy generating device is comprised of a material having a high alpha over epsilon material property that is responsive to light and that generates heat therefrom, said energy generating device configured to generate a preselected amount of heat after being exposed to a preselected amount of light, said releasable clamping mechanism being configured to be responsive to said preselected amount of heat and operative to release said deployable structure from said stowed circumstance after being exposed to said preselected amount of heat.

16. A spacecraft as in claim 14, wherein said preselected environmental circumstance is a presence of positively charged protons, said energy generating device being configured to collect protons and generate a preselected amount of electrostatic discharge upon collecting a preselected amount of said positively charged protons, said releasable clamping mechanism being configured to be responsive to said preselected amount of electrostatic discharge and operative to release said deployable structure from said stowed circumstance after being exposed to said preselected amount of electrostatic discharge.

17. A spacecraft as in claim 14, wherein said preselected environmental circumstance is a presence of positively charged protons and negatively charge electrons, said energy generating device is comprised of two materials spaced apart from one another, one material being configured to absorb electrons, the other material being configured to absorb protons, said energy generating device operative to generate a preselected amount of electric potential between the two materials upon absorption of a preselected number of protons and electrons, said releasable clamping mechanism being configured to be responsive to said preselected amount of electric potential and operative to release said deployable structure from said stowed circumstance after being exposed to said preselected amount of electric potential.

18. The spacecraft as in claim 17, wherein said preselected amount of electrostatic potential being operative to move a first portion of said materials towards each other thereby displacing a second portion of said materials away from each other, said releasable clamping mechanism being configured to be responsive to said displacement and operative to release said deployable structure from said stowed state after being exposed to said displacement.

* * * * *